US006556595B2

(12) United States Patent
Kobayashi et al.

(10) Patent No.: US 6,556,595 B2
(45) Date of Patent: *Apr. 29, 2003

(54) HYBRID WIGGLER

(75) Inventors: Hideki Kobayashi, Fukui-ken (JP); Teruaki Tobita, Fukui-ken (JP); Masayuki Kawai, Ibaraki-ken (JP); Noriyuki Tsukino, Tokyo (JP)

(73) Assignees: Shin-Etsu Chemical Co., Ltd., Tokyo (JP); Kawasaki Jukogyo Kabushiki Kaisha, Kobe (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 93 days.

(21) Appl. No.: 09/257,120

(22) Filed: Feb. 25, 1999

(65) Prior Publication Data

US 2002/0044579 A1 Apr. 18, 2002

(30) Foreign Application Priority Data

Mar. 3, 1998 (JP) .......................................... 10-050818

(51) Int. Cl.[7] .................................................. H01S 3/00

(52) U.S. Cl. ................................... 372/2; 315/4; 315/5

(58) Field of Search ................................ 315/503, 500, 315/4, 3, 535; 372/2

(56) References Cited

U.S. PATENT DOCUMENTS

| | | | | |
|---|---|---|---|---|
| 4,761,584 A | * | 8/1988 | Halbach | 315/4 |
| 5,010,640 A | * | 4/1991 | Gottschalk | 29/602.1 |
| 5,099,175 A | * | 3/1992 | Schlueter et al. | 315/4 |
| 5,183,515 A | * | 2/1993 | Ueno | 148/101 |
| 5,351,248 A | * | 9/1994 | Iracane | 372/2 |
| 5,563,568 A | * | 10/1996 | Sasaki et al. | 335/306 |
| 5,714,850 A | * | 2/1998 | Kitamura et al. | 315/507 |
| 5,939,964 A | * | 8/1999 | Domigan | 335/306 |
| 5,945,899 A | * | 8/1999 | Leupold | 335/210 |
| 6,057,656 A | * | 5/2000 | Ohashi et al. | 315/503 |

FOREIGN PATENT DOCUMENTS

JP 9-161999 6/1997

OTHER PUBLICATIONS

A.A. Varfolomeev, et al., "Large–field–strength short–period undulator design", Jul. 1, 1992, vol. A318, No. 1/03, pp. 813–817, XP 000296555.

Patent Abstracts of Japan, vol. 1997, No. 11, Nov. 28, 1997 & JP 09 184051 A.

M. Barthes, et al., "The Asymetric Hybrid Wiggler at Orsay", vol. 28, No. 1, pp. 601–604, XP 000937763.

E. Hoyer, et al., "A New Wiggler Beam line for SRRL." Aug. 9, 1982, vol. 208, No. 1–3, pp. 117–125, XP 002147369.

Qing Xiang Liu, et al., "The short–period wiggler for CAEP FIR–FEL.", Apr. 21, 1998, vol. 407, No. 1–3, pp. 392–395, XP 004131920.

* cited by examiner

*Primary Examiner*—Leon Scott, Jr.
(74) *Attorney, Agent, or Firm*—Reed Smith LLP

(57) ABSTRACT

Disclosed is a novel hybrid wiggler as a kind of insertion devices, for example, in an electron accelerator. Different from a conventional hybrid wiggler consisting of two oppositely facing arrays each formed of an alternate arrangement of a plurality of permanent magnet blocks and a plurality of pole pieces of a soft magnetic material to generate a sine-curved periodical magnetic field in the gap space between the arrays to cause meandering of electron beams, each of the pole pieces is sandwiched on the lateral surfaces with a pair of auxiliary permanent magnet blocks so that the periodical magnetic field generated in the gap space can be greatly strengthened.

6 Claims, 6 Drawing Sheets

HYBRID WIGGLER

BACKGROUND OF THE INVENTION

The present invention relates to a novel insertion device or, in particular, to a wiggler which is inserted to the linear part of an electron accelerator or an electron storage ring to emit a synchrotron radiation of high brilliance.

An insertion device consists of two oppositely facing arrays with a gap space therebetween each formed of permanent magnet blocks or consisting of two arrays each formed of permanent magnet blocks and blocks of a magnetically soft ferromagnetic material, such as iron or an alloy of iron and cobalt, in combination. FIG. 6A of the accompanying drawing illustrates a schematic perspective view of an insertion device consisting of two arrays of permanent magnet blocks alone, in which the small arrow appearing on the side surface of each of the magnet blocks indicates the direction of magnetization of the block. This insertion device is inserted into the straightly linear part of an electron accelerator or an electron storage ring in such a fashion as to sandwich a vacuum chamber between the magnet arrays as shown in FIG. 6A generating a sine-curved periodical magnetic field within the vacuum space between the magnet arrays as is shown in FIG. 6B. When electrons at a near-light velocity circulating in an electron accelerator are introduced into such a wiggled or undulated magnetic field along the z-direction of the magnet arrays, the electron beam causes meandering through the space in the direction indicated by the arrow e in FIG. 6A to emit a synchrotron radiation R from each meandering point as is schematically shown in FIG. 6C.

As is mentioned above, the insertion devices to generate the sine-curved periodical magnetic field can be classified into the Halbach type ones consisting of permanent magnet blocks alone and the hybrid type ones consisting of permanent magnet blocks and blocks of a magnetically soft ferromagnetic material in combination as disclosed in Nuclear Instruments and Methods, volume 288 (1983), pages 117–125 and Review of Scientific Instruments, volume 58(3), March, 1987. FIG. 7 is a schematic side view, as viewed in the direction of the x-axis, of the magnet block arrays in a Halbach type insertion device consisting of the permanent magnet blocks 41, 42 alone, each of which is magnetized in the direction indicated by the respective small arrow on the side surface of the block 41 or 42. The period of the sine-curved periodical magnetic field corresponds to the length P formed with four adjacent permanent magnet blocks.

In the hybrid type insertion device, as is illustrated in FIG. 8A by a schematic plan view as viewed in the direction of the y-axis, each of the magnet array consists of an alternate arrangement of permanent magnet blocks 41 and pole pieces 43 of a magnetically soft ferromagnetic material which serve to converge the magnetic fluxes. A period P of the sine-curved periodical magnetic field in this case has a length formed from two permanent magnets 41 and two pole pieces 43. The strength and distribution of the magnetic field accomplished in the above mentioned two types of insertion devices are substantially identical without particular differences in the performance excepting for an economical advantage in the hybrid type ones because the overall amount of the permanent magnets can be saved as compared with the Halbach type ones.

Insertion devices of these types can also be classified into undulators and wigglers depending on the value of the parameter K which is a function of the length of the period P and the strength of the magnetic field. Namely, an insertion device is an undulator or a wiggler when the value of K is about 1 or smaller or when the value of K is substantially larger than 1, respectively.

The present invention relates to a hybrid-type insertion device or, more particularly, to a hybrid-type wiggler. In a hybrid-type wiggler, as is illustrated by the schematic plan and side views in FIGS. 8A and 8B, respectively, each of the pole pieces 43 in the magnet array is sandwiched between two permanent magnet blocks 41 magnetized each in a reversed direction to that of the nearest magnet block along the direction of the array or center axis C and the magnetic flux is converged to the respective pole pieces 43 so that a strong magnetic field is generated in the gap space having a distance d between two arrays of the permanent magnets 41 and the pole pieces 43. As is shown in FIG. 8A, each of the pole pieces 43 has a dimension in the direction of the x-axis smaller than that of the permanent magnet blocks 41 in the same direction in order to facilitate conversion of the magnetic fluxes onto the center axis C along which the electrons travel.

Since wigglers are used for generating radiation of a particularly high energy or hard X-rays, the magnetic field generated in the gap space between the magnet block arrays must be strong enough. While the magnetic field can be increased by decreasing the distance d between the magnet block arrays, it is not practical to decrease the distance d of the gap space to be substantially smaller than 10 mm in order to ensure keeping of a space for the vacuum chamber. Although the magnetic field can be increased to some extent by using permanent magnet blocks of an increased volume, this means does not provide a solution of the problem because, in the hybrid-type wigglers, the magnetic field is limited by the magnetic saturation of the pole pieces 43 as the volume of the permanent magnet blocks 41 is increased and, in the Halbach-type wigglers, contribution to the magnetic field can be exhibited only by the volume portions of the permanent magnet blocks in the proximity to the center axis C and the volume portions remote from the center axis C have little contribution.

It is an estimation that the wiggler in a medium-size synchrotron radiating instrument is required to generate a magnetic field of at least 2 T as the peak value of the periodical magnetic field if hard X-rays are to be utilized in the instrument. Needless to say, the utilizability of any synchrotron radiation instruments can be increased as the magnetic field generated in the wiggler thereof is increased since synchrotron radiations of a wider energy range can be provided.

SUMMARY OF THE INVENTION

The present invention accordingly has an object to provide a hybrid-type wiggler capable of generating a high periodical magnetic field which cannot be obtained in the wigglers of the prior art.

Thus, the present invention provides a wiggler of the hybrid type consisting of a pair of oppositely facing arrays with a gap space therebetween each formed of a plurality of main permanent magnet blocks and a plurality of blocks of a magnetically soft ferromagnetic material, such as iron or an iron-cobalt alloy, as pole pieces alternately arranged in the longitudinal direction of the array, each main permanent magnet block in one array facing one of the main permanent magnet blocks in the other array and each pole piece in one array facing one of the pole pieces in the other array, in which each of the pole pieces is sandwiched at the lateral surfaces with a pair of auxiliary permanent magnet blocks.

DETAILED DESCRIPTION OF THE PREFERRED EMBODIMENTS

As is understood from the above given description, the most characteristic feature of the inventive hybrid wiggler consists in that each of the magnetically soft pole pieces, which is disposed between two adjacent main permanent magnet blocks in an array, is sandwiched on the lateral surfaces with a pair of auxiliary permanent magnet blocks, by virtue of which an unexpectedly high magnetic field can be generated within the gap space between the two arrays.

In the following, the hybrid wiggler of the invention is illustrated in detail by making reference to the accompanying drawing.

Figure 1A:
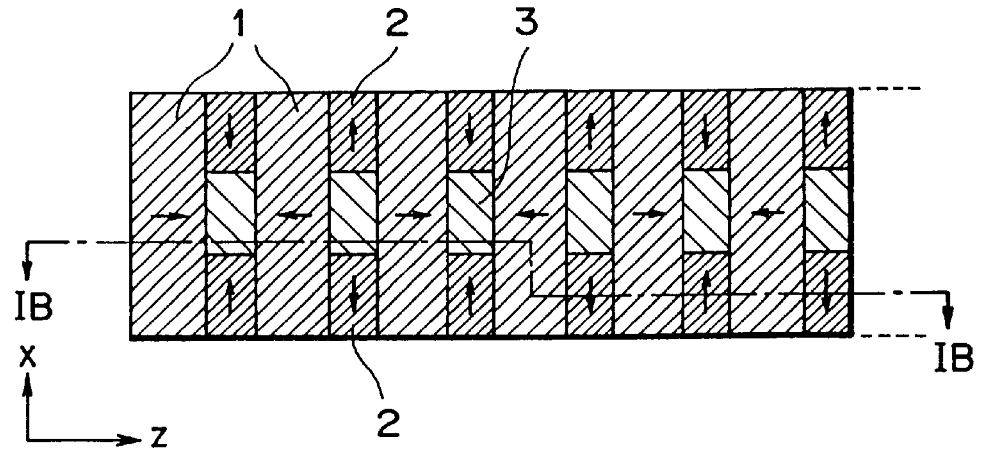
FIG. 1A is an x–z cross sectional view of the hybrid wiggler of the invention as viewed on the x–z plane
Figure 1B:
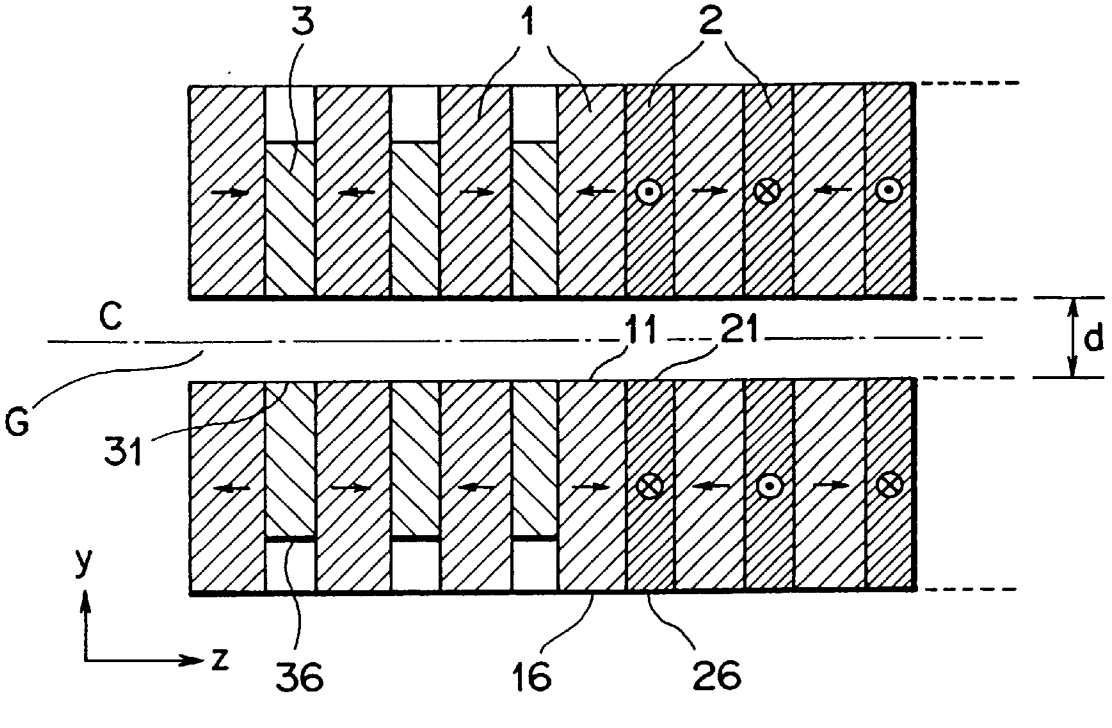
FIG. 1B is a cross sectional view of the same hybrid wiggler of the invention as cut and viewed along the plane indicated by the arrows IB—IB in FIG. 1A.
Figure 8A:
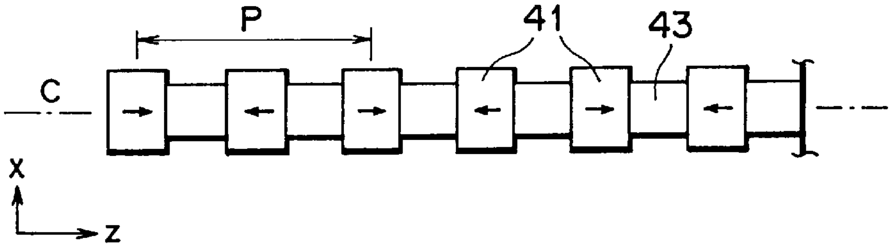
FIG. 8A PRIOR ART
FIG. 8A is a schematic x–z plan view of a conventional hybrid wiggler.
Figure 8B:
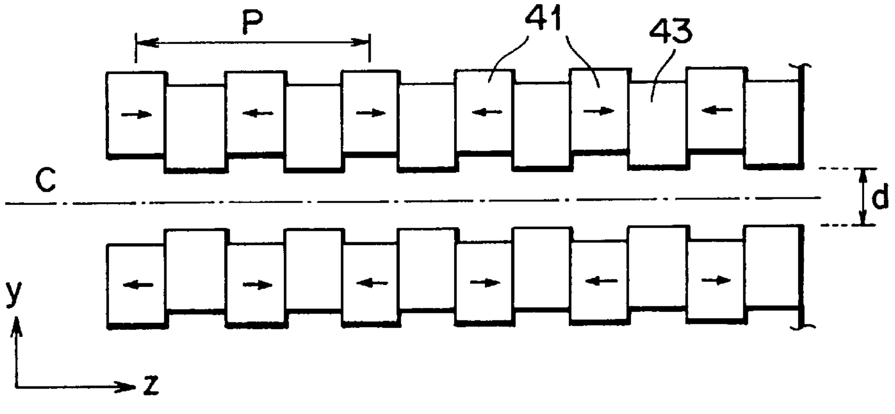
FIG. 8B PRIOR ART
FIG. 8B is a schematic y–z side view of a conventional hybrid wiggler.

FIG. 1A is a cross sectional view of a magnet block array in the inventive hybrid wiggler as cut within an x–z plane and FIG. 1B is a cross sectional view of the same hybrid wiggler within a y–z plane as cut along the lines indicated by the arrows IB—IB in FIG. 1A. As is understood from these figures, the hybrid wiggler consists basically of a pair of oppositely facing magnet block arrays, leaving a gap space G of a distance d therebetween, each array being formed, like a conventional hybrid wiggler illustrated in FIGS. 8A and 8B, from a plurality of permanent magnet blocks 1,1, referred to as the main magnets hereinafter, and a plurality of blocks 3,3 of a magnetically soft ferromagnetic materia, referred to as pole pieces hereinafter, alternately arranged in the longitudinal direction of the array. The direction of magnetization of the main magnets 1,1 is along the direction of the z-axis, i.e. in the longitudinal direction of the magnet block array, but they are magnetized in alternately reversed directions as is indicated by the small arrows written in each of the cross sections 1,1. The periodical magnetic field generated in the gap space G is mainly the contribution of the main magnets 1,1 and the pole pieces 3,3.

Different from the magnet block arrays in a conventional hybrid wiggler, each of the pole pieces 3,3 is sandwiched on the lateral surfaces with a pair of auxiliary permanent magnet blocks 2, 2, referred to as the auxiliary magnets hereinafter. Namely, each of the pole pieces 3 is surrounded by four permanent magnet blocks, of which two are the main magnets 1,1 sandwiching the pole piece 3 in the longitudinal direction of the array and the other two are the auxiliary magnets 2,2 sandwiching the pole piece 3 on the lateral surfaces. The direction of magnetization of the auxiliary magnets is perpendicular to the z-axis and within the x–z plane but the magnetization direction of an auxiliary magnet 2 is reversed to that of the opposite auxiliary magnet 2 sandwiching the pole piece 3 and to that of the nearest pair of the auxiliary magnets 2,2. By virtue of these auxiliary magnets 2,2, the sine-curved periodical magnetic field in the gap space G can be greatly strengthened.

It is preferable that the end surfaces 11, 21 and 31 of the main magnets 1, auxiliary magnets 2 and pole pieces 3, respectively, facing the gap space G are substantially coplanar while the outwardly facing end surfaces 16, 26 of the main magnets 1 and auxiliary magnets 2, which per se are coplanar, are not coplanar with the outwardly facing end surfaces 36 of the pole pieces 3,3 which are recessed as is shown in FIG. 1B, left half. This arrangement of the respective blocks 1, 2, 3 is important in order to prevent leakage of the magnetic fluxes outside of the wiggler system but to converge the magnetic fluxes toward the gap space G.

In the insertion devices, the requirement to minimize the variations in the distribution of the magnetic field is generally so great that adjustment of the magnetic field is usually indispensable after assemblage of the magnet block arrays. Several methods are known for this magnetic field adjustment including the method in which a thin plate of a magnetically soft magnetic material is attached to the end surface of each of the permanent magnet blocks facing the gap space G and a method in which members made from a magnetically soft magnetic material, which have an effect of magnetic field adjustment, are disposed outside of the permanent magnet block array. The former method is not applicable to the inventive hybrid wiggler because no rooms are available for attaching the above mentioned magnetic thin plates to the end surfaces of the permanent magnet blocks and the latter method is also not practical because a complicated structure is required in the frame rack for holding the magnet block arrays.

Figure 2:
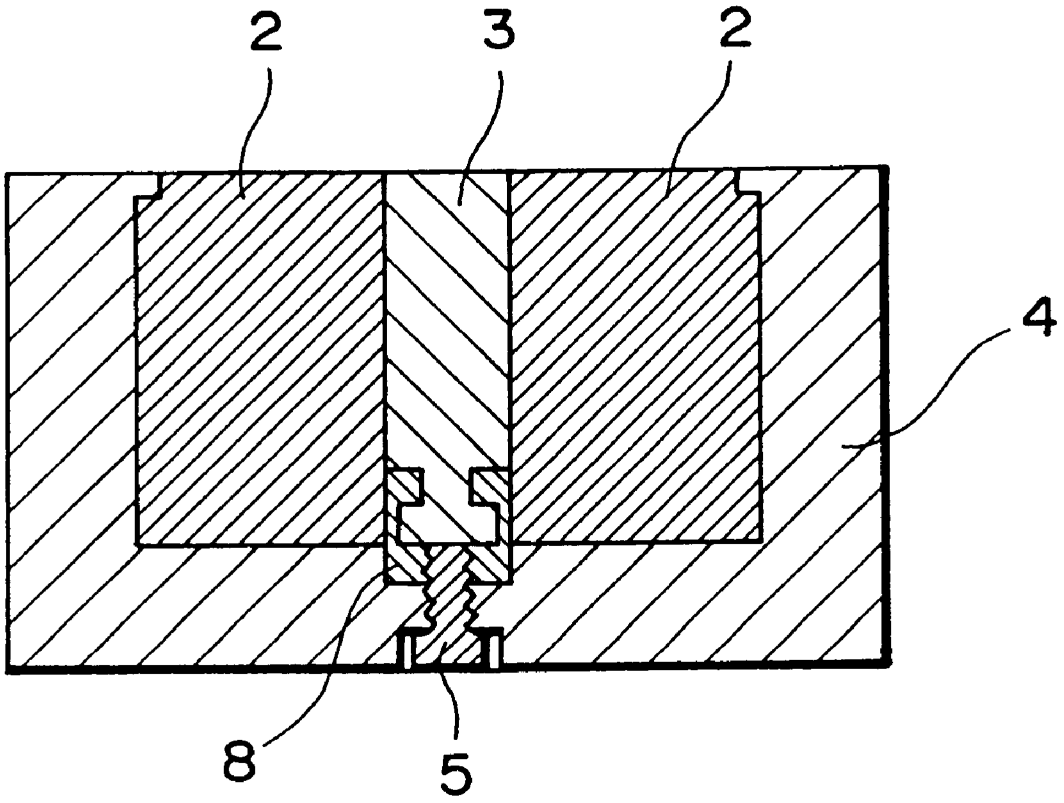
FIG. 2 is a cross sectional view of a magnetic field adjustment mechanism used in the inventive hybrid wiggler.

FIG. 2 illustrates a type of the frame rack by a cross sectional view within an x–y plane comprising a holder 4 for holding the permanent magnet blocks 2,2 and a holder 8 for holding the pole pieces 3 in a slidable fashion between the oppositely facing auxiliary magnets 2,2 by rotating the thrust screw 5, by means of which the pole piece 3 is displaceable in the vertical direction relative to the main and auxiliary permanent magnet blocks 1,1,2,2 surrounding the same. Since the position of the pole piece 3 has a great influence on the magnetic field within the gap space G, a full effect of magnetic field adjustment can be obtained even with a very small adjusting rotation of the thrust screw 5.

The magnetic material forming the pole pieces 3 is a magnetically soft ferromagnetic material such as iron and iron-based alloys, of which iron-cobalt alloys are preferred in respect of their high saturation magnetization.

In the following the hybrid wiggler of the present invention is described in more detail by way of an Example.

EXAMPLE

Figure 3B:
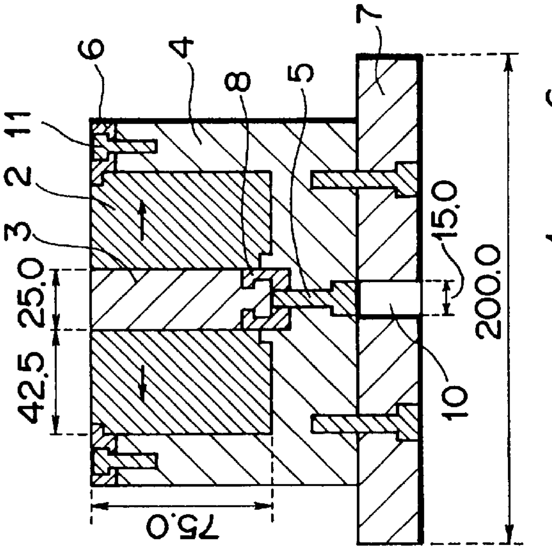
FIG. 3B is a cross sectional view of the inventive hybrid wiggler illustrated in FIG. 3A as cut and viewed along the direction indicated by the arrows IIIB—IIIB in FIG. 3A.
Figure 3C:
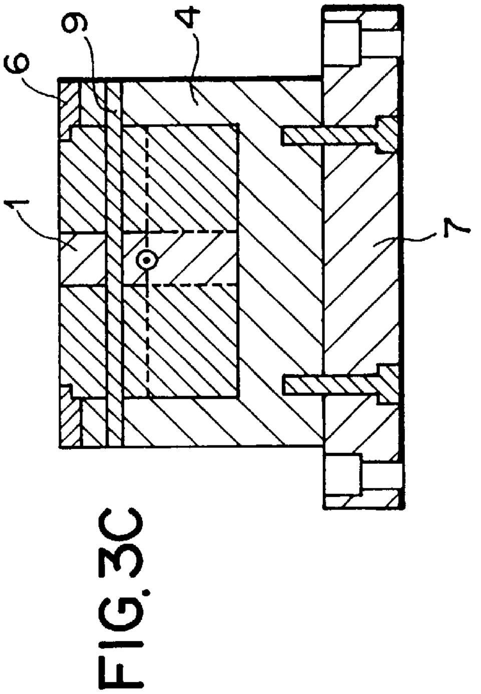
FIG. 3C is a cross sectional view of the inventive hybrid wiggler illustrated in FIG. 3A as cut and viewed along the direction indicated by the arrows IIIC—IIIC in FIG. 3A.
Figure 3A:
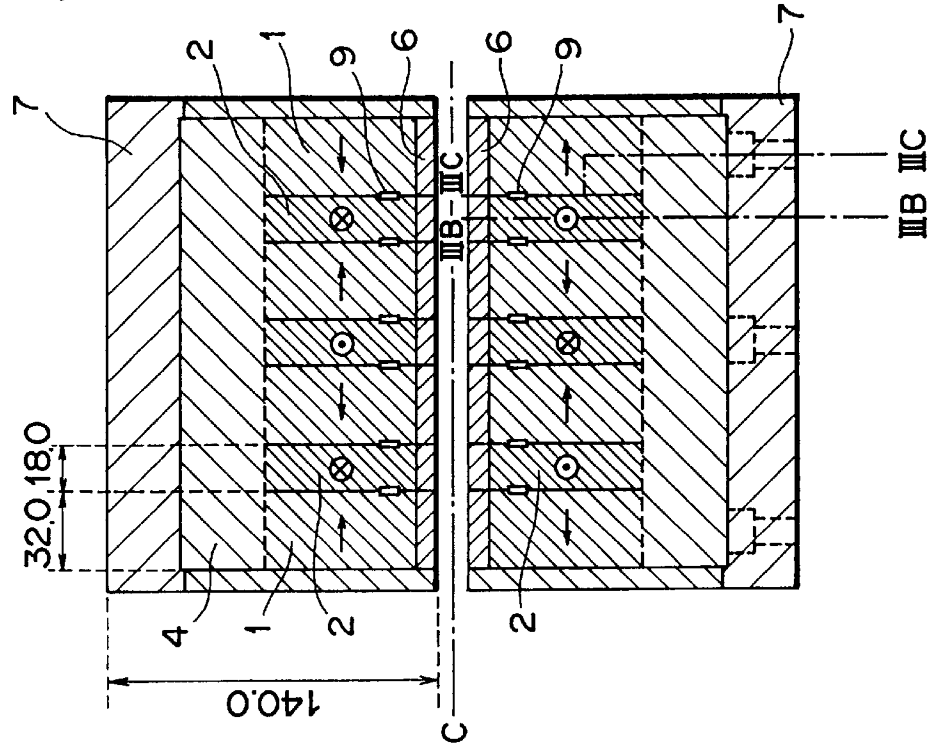
FIG. 3A is a lengthwise cross sectional view of the inventive hybrid wiggler prepared in the Example.

A hybrid wiggler illustrated in FIGS. 3A, 3B and 3C by cross sectional views was prepared. The dimensions given in the figures are each in the unit of millimeters. FIG. 3A is a vertical cross sectional view of the magnet block array assembly as cut within the y–z plane containing the center axis C. The cross sectional view of FIG. 3B is a cross section as cut and viewed along the line indicated by the arrows IIIB—IIIB in FIG. 3A. The cross sectional view of FIG. 3C is a cross section as cut and viewed along the lines indicated by the arrows IIIC—IIIC in FIG. 3A.

The permanent magnet material used for the main magnets 1,1 and the auxiliary magnets 2,2 was a neodymium-iron-boron magnet having a residual magnetization Br of 12.9 kG and a coercive force iHc of 12.9 kOe (N42H, a product by Shin-Etsu Chemical Co.) and the pole pieces 3,3 were made from an iron-cobalt alloy having a saturation magnetization of 23.1 kG (Cemendur, a product by Tokin Co.). Three pole pieces 3,3 were assembled for each of the magnet block arrays over a distance of 100 mm. The gap distance d between the magnet block arrays had a variable distance of 3 to 30 mm.

Each of the magnet block arrays, which consisted of four main magnets 1,1 and three pole pieces 3,3 each sandwiched on the lateral surfaces with a pair of auxiliary magnets 2,2 as assembled with the non-magnetic holders 4 and 8, was protected with the protective guards 9 and fixed by the magnet pressers 6 with screw bolts 11 to be mounted on a base plate 7 having openings 10 for insertion of a thrust screw 5 for fine position adjustment of the pole pieces 3.

The above prepared hybrid wiggler was a test model of a ½-reduced scale of an actual hybrid wiggler. For example, a gap space distance d of 5 mm in this test model corresponded to a gap space distance of 10 mm in an actual model.

Figure 4:
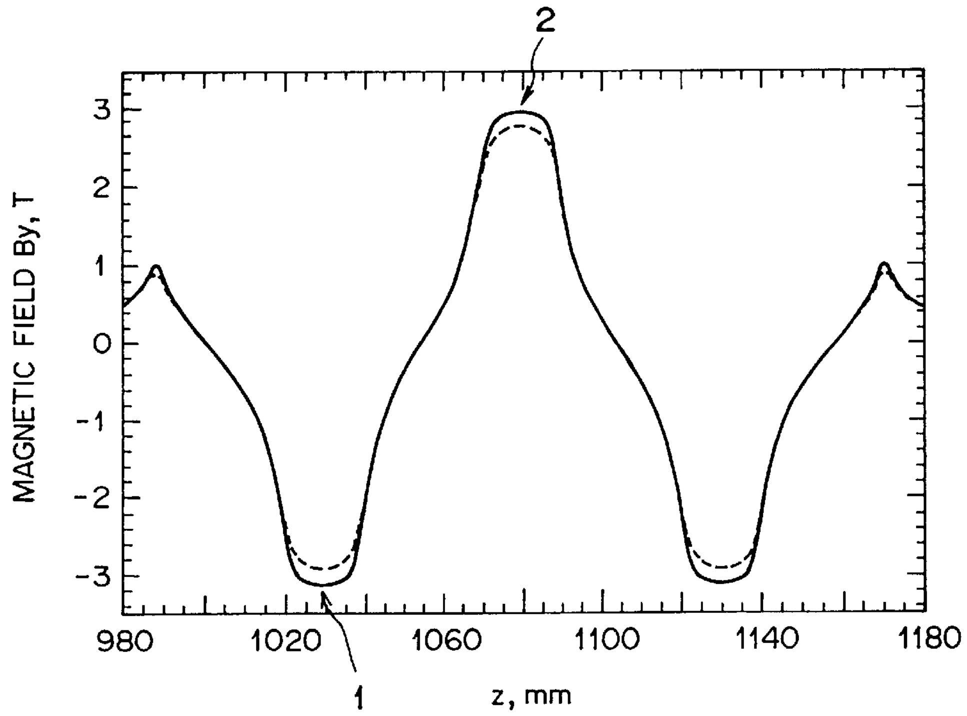
FIG. 4 is a graph showing distribution of the magnetic field along the center axis in the inventive hybrid wiggler described in the Example.

FIG. 4 is a graph showing the results obtained by the measurement of the periodical magnetic field $B_y$ in the direction of the y-axis along the center axis C in the above prepared test wiggler for a gap distance d of 3.5 mm (solid line) or 5.0 mm (dotted line) taking the distance z along the z-axis as the abscissa. It was noted that the value of the upper-side peak 2 is slightly smaller than the value of the lower-side peak 1. This is because the upper-side peak is sandwiched between the downwardly directed peak magnetic fields. This situation is different in an actual wiggler having a larger number of periods in which the peak magnetic field would have a value approximating that of the peak 2 as a center peak.

Figure 5:
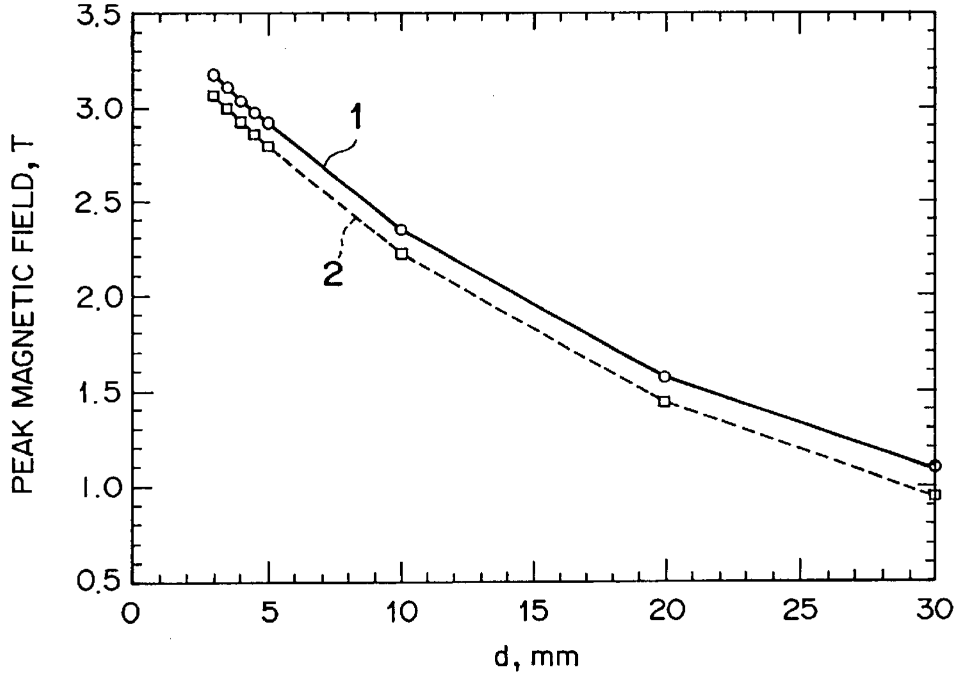
FIG. 5 is a graph showing the peak value of the periodical magnetic field as a function of the gap distance d.
Figure 6A:
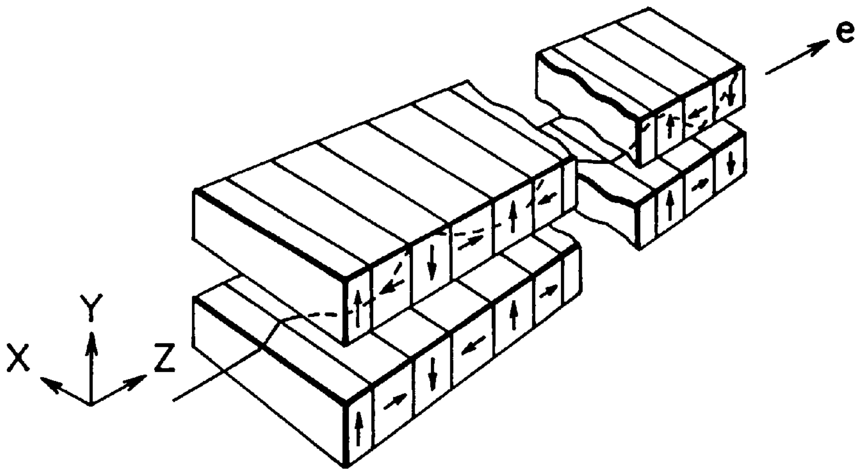
FIG. 6A PRIOR ART
FIG. 6A is a schematic perspective view of a prior art insertion device.
Figure 6B:
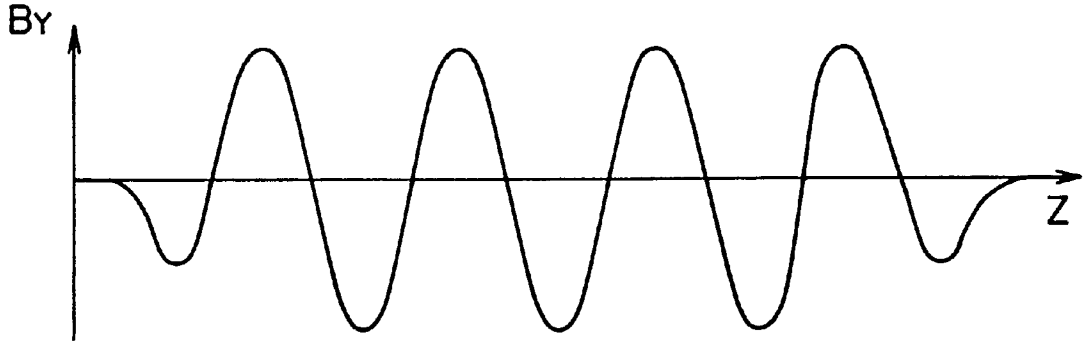
FIG. 6B PRIOR ART
FIG. 6B shows the sine-curved periodical magnetic field in the gap space of the insertion device illustrated in FIG. 6A.
Figure 6C:
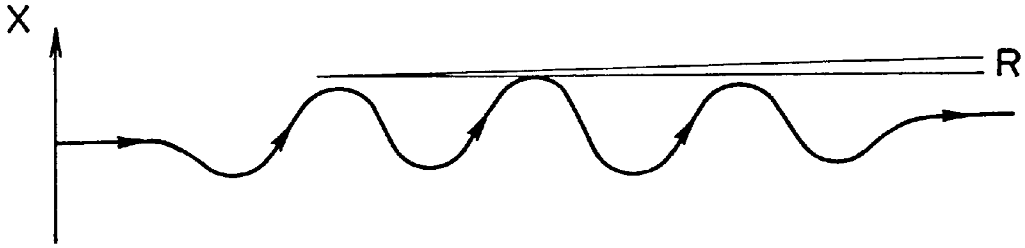
FIG. 6C PRIOR ART
FIG. 6C shows the meandering electron orbit through the gap space of the insertion device illustrated in FIG. 6A.
Figure 7:
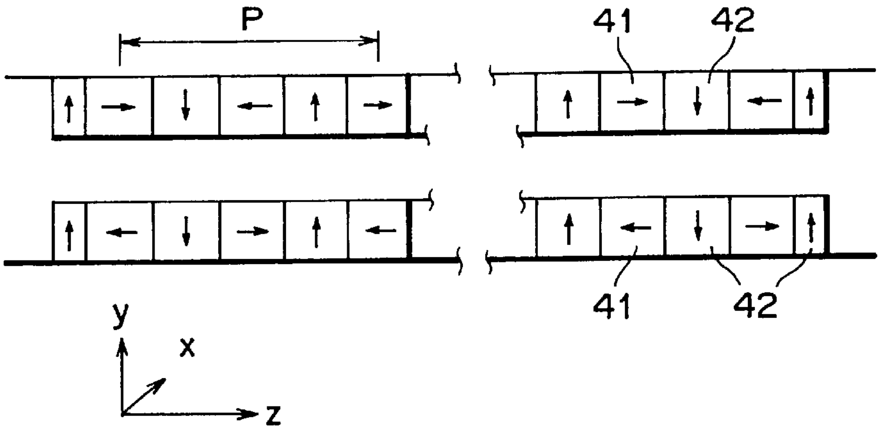
FIG. 7 PRIOR ART
FIG. 7 is a schematic y–z side view of a Halbach-type wiggler along the longitudinal direction.

FIG. 5 is a graph showing the peak values (absolute values) of the magnetic field for the peaks 1 (curve 1) and 2 (curve 2) when the gap space distance d was varied up to 30 mm. The peak value of the peak 2 was 2.8 T and 3.0 T when the gap space distance d was 5.0 mm or 3.5 mm, respectively, corresponding to a gap space distance of 10 mm and 7 mm, respectively, in an actual wiggler.

What is claimed is:

1. A wiggler of the hybrid type consisting of a pair of oppositely facing arrays with intervention of a gap space therebetween each formed of a plurality of main permanent magnet blocks and a plurality of blocks of a magnetically soft ferrromagnetic material as pole pieces alternately arranged in the longitudinal direction of the array, each main permanent magnet block in one array just facing one of the main permanent magnet blocks in the other array and each pole piece in one array just facing one of the pole pieces in the other array, in which each of the pole pieces is sandwiched on the lateral surfaces with a pair of auxiliary permanent magnet blocks and wherein each of the pole pieces is provided with a mechanical means by which the pole piece is slidable in the direction perpendicular to the longitudinal direction of the array within the space surrounded by a pair of the main permanent magnet blocks and a pair of the auxiliary permanent magnet blocks.

2. The wiggler of the hybrid type as claimed in claim 1 in which the magnetically soft ferromagnetic material forming the pole pieces is an alloy of iron and cobalt.

3. The wiggler of the hybrid type as claimed in claim 1 in which the direction of magnetization of a main permanent magnet block is parallel to the longitudinal direction of the array and reversed to that of the nearest main permanent magnet block with intervention of a pole piece therebetween.

4. The wiggler of the hybrid type as claimed in claim 1 in which the direction of magnetization of an auxiliary permanent magnet block is perpendicular to the longitudinal direction of the array, two auxiliary permanent magnet blocks in a pair sandwiching the pole piece being magnetized in a reversed direction one to the other.

5. The wiggler of the hybrid type as claimed in claim 1 in which the end surfaces of the main permanent magnet blocks, pole pieces and auxiliary permanent magnet blocks in an array facing the gap space are substantially coplanar.

6. The wiggler of the hybrid type as claimed in claim 1 in which the end surface of the pole piece remote from the gap space is recessed relative to the end surfaces of the main and auxiliary permanent magnet blocks remote from the gap space.

* * * * *